April 6, 1926.  
W. F. WILLIAMS  
SPOTLIGHT  
Filed August 22, 1923   2 Sheets-Sheet 2
1,579,424
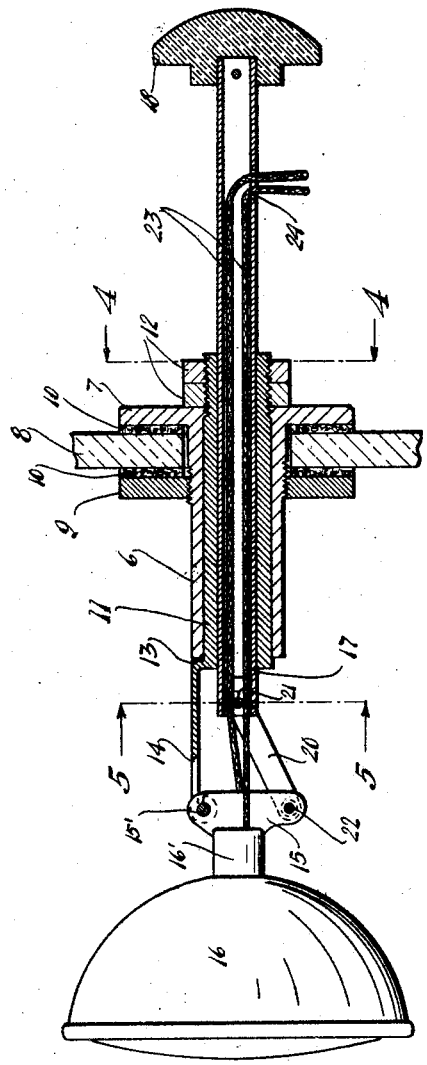
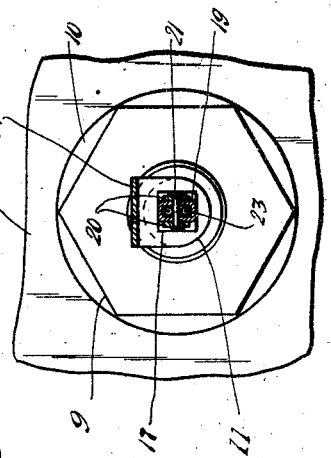
Fig. 5
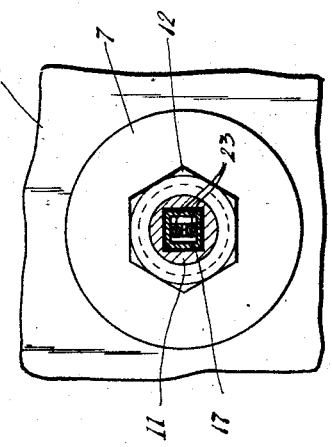
Fig. 4
Witnesses:
Inventor:  
William F. Williams  
By Joshua R H Potts  
His Attorney.

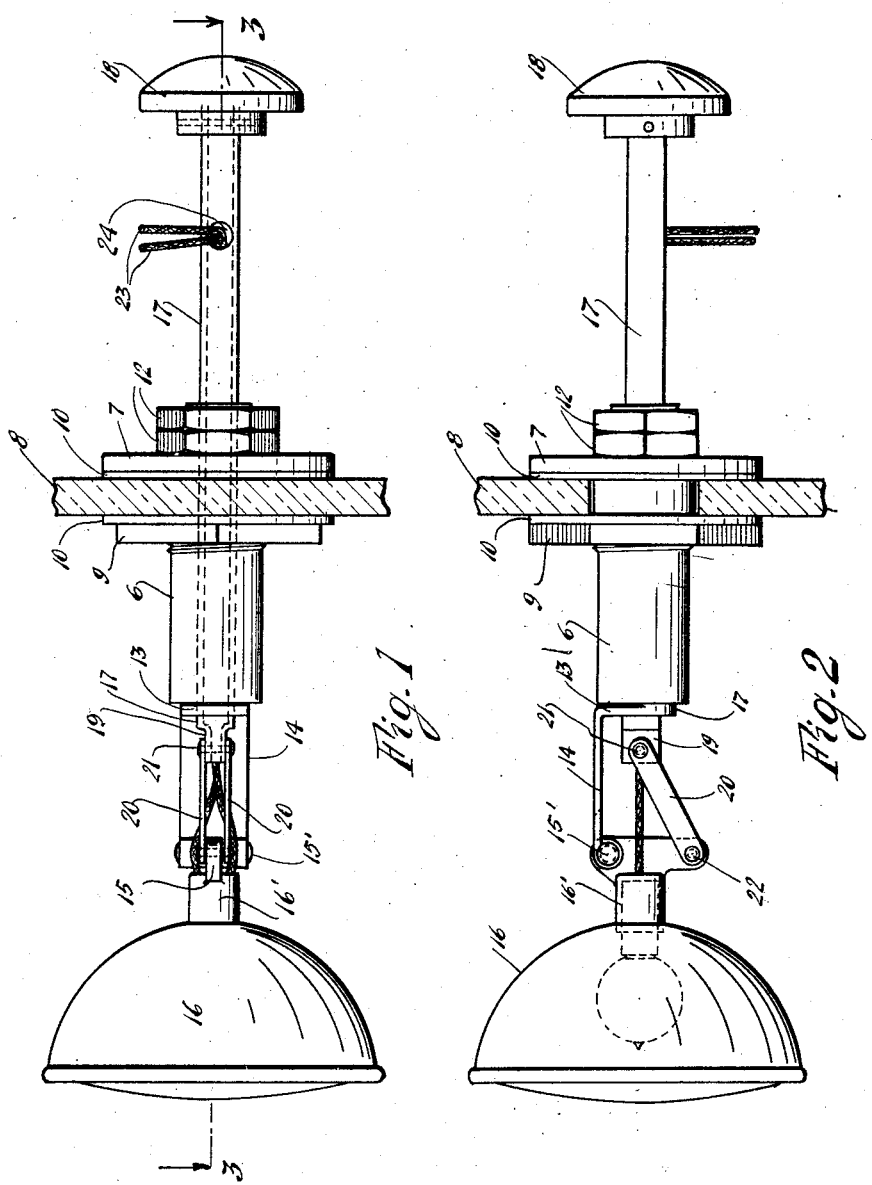

Patented Apr. 6, 1926.

1,579,424

UNITED STATES PATENT OFFICE.

WILLIAM F. WILLIAMS, OF CHICAGO, ILLINOIS.

SPOTLIGHT.

Application filed August 22, 1923. Serial No. 658,685.

*To all whom it may concern:*

Be it known that I, WILLIAM F. WILLIAMS, a citizen of the United States, and a resident of the city of Chicago, county of Cook, and State of Illinois, have invented certain new and useful Improvements in Spotlights, of which the following is a specification.

My invention relates to improvements in spot lights, especially adapted for use on automobiles and the like, and has for its object the provision of an improved construction of this character which is capable of economical manufacture and permits of the ready adjustment of the light to various positions.

Other objects will appear hereinafter.

The invention consists in the combinations and arrangements of parts hereinafter described and claimed.

The invention will be best understood by references to the accompanying drawings forming a part of this specification, and in which—

Fig. 1 is a bottom plan view of a construction embodying the invention;

Fig. 2, a side view of the same;

Fig. 3, a section taken on line 3—3 of Fig. 1;

Fig. 4, a section taken on line 4—4 of Fig. 3; and

Fig. 5, a section taken on line 5—5 of Fig. 3.

The preferred form of construction as illustrated in the drawings comprises a sleeve 6 having a stop flange 7 at one end, said sleeve being adapted and arranged to fit through an opening in the windshield 8 of an automobile. A locking collar or nut 9 is threaded on the sleeve 6 as shown and packing washers 10 are interposed between the flange and collar and the sides of the windshield glass, said sleeve being securely clamped in place on the windshield by means of the collar 9.

A tubular member 11 is rotatably mounted in the sleeve 6 being held in place by means of lock nuts 12 at the rear end and a stop shoulder 13 at the top of the forward end thereof, said lock nuts serving to impart sufficient friction to the mounting so that the tubular member 11 will retain, through such friction, adjusted positions in the sleeve 6.

A supporting arm 14 extends forwardly from the shoulder 13 and a depending lever 15 is fulcrumed at 15' on said supporting arm, said lever depending and extending substantially diametrically across the end of the tubular member 11. An electric spot light 16 is centrally mounted on the lever 15 by means of the stem or socket 16'. A tubular plunger 17 is mounted for longitudinal movement in the member 11 and is extended rearwardly well beyond said member 11 where it is equipped with an operating knob or handle 18 rigidly secured thereto. At its forward end 19 the plunger 17 is flattened as shown in Fig. 1 and links 20 connected thereto by means of a rivet 21 extending centrally through the flattened portion of the plunger. The links 20 are also pivotally connected at 22 to the lower free end of the lever 15 and whereby longitudinal movement of plunger 17 will rock or tilt the spot light 16 as will be readily understood. Sufficient friction is provided between the plunger 17 and the tubular member 11 to hold the same in adjusted positions. This is facilitated by the specific mounting of the light, it requiring considerable force to move the light after it has been once adjusted. It will be observed that the light is mounted in substantial longitudinal alinement with the plunger 17 and also that the light tends to assume by its own weight a position tilting slightly forwardly and downwardly in position to cast the light rays onto the roadway ahead of the car which is substantially the normal position of the light, thus greatly facilitating the return of the light to normal position when use has been made thereof under abnormal conditions.

The spot light 16 is equipped with the usual electric light bulb supplied with current through the wires 23 extending into the plunger 17 through an opening 24 provided for the purpose and passing thence forwardly along opposite sides of the rivets 21 and leading into the socket 16' of the light.

In use the light 16 may be turned upwardly or downwardly by forcing the handle 18 forward or back and the light 16 swung on a horizontal axis by turning the handle or knob 18. This arrangement constitutes a simple and effective one for the purpose and one which is capable of economical manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A construction of the class described comprising a sleeve having a flange at one end; a collar threaded on said sleeve and adapted to clamp the glass of a windshield; a tubular member extending through said sleeve; a lock nut at the rear end of said tubular member engaging against said flange; a stop shoulder and supporting arm at the top of the forward end of said tubular member; a depending lever pivoted at the forward end of said supporting arm; a light mounted substantially centrally on said lever; a plunger extending through said tubular member; and an operative connection between said plunger and the free end of said lever, substantially as described.

2. A construction of the class described comprising a sleeve having a flange at one end; a collar threaded on said sleeve and adapted to clamp the glass of a windshield; a tubular member extending through said sleeve; a lock nut at the rear end of said tubular member engaging against said flange; a stop shoulder and supporting arm at the top of the forward end of said tubular member; a depending lever pivoted at the forward end of said supporting arm; a light mounted substantially centrally on said lever; a plunger extending through said tubular member; a link connection between the forward end of said plunger and the free end of said lever; electric wires passing through said plunger and connected with said light; and an operating handle on the rear end of said plunger, said plunger being extended well beyond said tubular member at the rear, substantially as described.

In testimony whereof I have signed my name to this specification.

WILLIAM F. WILLIAMS.